V. PUC.
SAFETY PIN.
APPLICATION FILED AUG. 6, 1919.
1,387,512.
Patented Aug. 16, 1921.
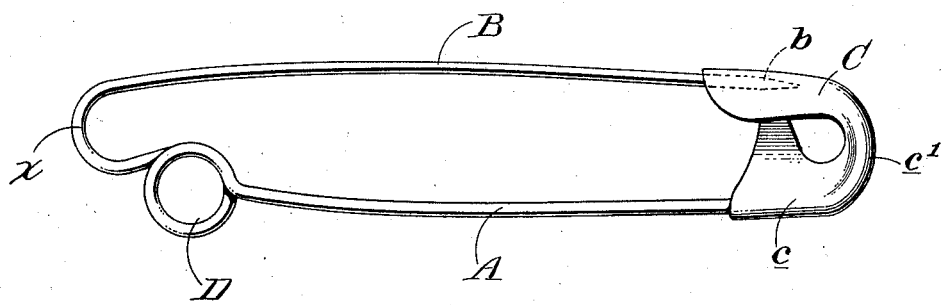
Inventor
Vojtech Puc
By his Attorneys
Baedwin Wight

UNITED STATES PATENT OFFICE.

VOJTECH PUC, OF PRAGUE-VINOHRADY, BOHEMIA.

SAFETY-PIN.

1,387,512.  Specification of Letters Patent.  Patented Aug. 16, 1921.

Application filed August 6, 1919. Serial No. 315,619.

*To all whom it may concern:*

Be it known that I, VOJTECH PUC, a citizen of the Czecho-Slovak Republic, residing at Prague-Vinohrady, in Bohemia, have invented certain new and useful Improvements in Safety-Pins, of which the following is a specification.

The object of this invention is to so construct a safety pin that it may be easily opened and closed and may be so formed as to present a smooth, looped end opposite the point of the pin which will not become readily engaged by threads, cloth or other obstructions which interfere with the easy insertion into or removal of the pin from the cloth.

According to my invention, instead of forming the coil spring in the end of the pin as usual I form it in one of the side members thereof, in the manner hereinafter explained.

The accompanying drawing shows a side elevation of a safety pin embodying my improvements.

The stationary member or shank of the pin is indicated at A and the pointed member at B, while C indicates a guard which may be of any desired construction.

Instead of forming the coil spring D at the end of the pin, *i. e.*, at $x$ as usual, I form the coil spring in the wire on the fixed side of the pin near the end $x$ thereof. This fixed side of the pin is connected with a sheet metal guard C at $c$ or $c'$ in any suitable way, and the pointed portion of the pin $b$ extends into the guard, as indicated by dotted line. In this way the end $x$ of the pin is made smooth and open and the pin may be readily applied to or detached from any kind of fabric without being held by threads or parts of the cloth which often enter between the coil and other portions of the pin. Furthermore, as the drawings indicate, the coil presents no angles on its inner side which tend to engage and hold the threads or parts of the cloth.

I claim as my invention:—

A safety pin having a pointed portion, a fixed portion, an uninterrupted looped outer end, and a guard to which one end of the fixed portion is attached and which is engaged by the pointed portion of the pin, said fixed portion being formed with a coil which lies wholly to one side of the loop.

In testimony whereof, I have hereunto subscribed my name.

VOJTECH PUC.